(12) United States Patent
Lim et al.

(10) Patent No.: US 8,775,632 B2
(45) Date of Patent: Jul. 8, 2014

(54) METHOD AND SYSTEM FOR MANAGING SESSION INFORMATION IN A MOBILE COMMUNICATION SYSTEM AND APPARATUS THEREFOR

(75) Inventors: Nae-Hyun Lim, Yongin-si (KR); Jae-Hong Chon, Soongnam-si (KR); Tae-Ho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1934 days.

(21) Appl. No.: 11/404,038

(22) Filed: Apr. 14, 2006

(65) Prior Publication Data

US 2007/0143483 A1 Jun. 21, 2007

(30) Foreign Application Priority Data

Dec. 16, 2005 (KR) .................. 10-2005-0124808

(51) Int. Cl.
*G06F 15/16* (2006.01)
(52) U.S. Cl.
USPC .......................................... 709/227
(58) Field of Classification Search
CPC ................................... H04W 36/12
USPC ................... 709/227–229; 370/328, 349
See application file for complete search history.

(56) References Cited

U.S. PATENT DOCUMENTS

| | | | | |
|---|---|---|---|---|
| 5,966,451 A * | 10/1999 | Utsumi | | 380/51 |
| 6,922,561 B2 * | 7/2005 | Chen et al. | | 455/435.1 |
| 7,006,827 B2 * | 2/2006 | Masuda et al. | | 455/439 |
| 7,079,511 B2 * | 7/2006 | Abrol et al. | | 370/331 |
| 7,103,662 B2 * | 9/2006 | Ray et al. | | 709/225 |
| 7,328,020 B2 * | 2/2008 | Masuda et al. | | 455/439 |
| 7,356,339 B2 * | 4/2008 | Nam | | 455/436 |
| 7,363,376 B2 * | 4/2008 | Uhlik et al. | | 709/227 |
| 7,457,265 B2 * | 11/2008 | Julka et al. | | 370/331 |
| 7,512,110 B2 * | 3/2009 | Sayeedi et al. | | 370/349 |
| 7,546,124 B1 * | 6/2009 | Tenneti et al. | | 455/436 |
| 7,561,555 B2 * | 7/2009 | Abrol et al. | | 370/338 |
| 7,613,461 B2 * | 11/2009 | Inoko | | 455/450 |

(Continued)

FOREIGN PATENT DOCUMENTS

KR 10-2005-0092585 A 9/2005

OTHER PUBLICATIONS

Korean Examination Report, issued by the Korean Patent Office on Jan. 16, 2012.

*Primary Examiner* — Rupal Dharia
*Assistant Examiner* — Marcus McKenzie
(74) *Attorney, Agent, or Firm* — Roylance, Abrams, Berdo & Goodman, L.L.P.

(57) ABSTRACT

A method and apparatus are provided for managing session information of an access terminal (AT) that has moved from a source subnet to a target subnet in a mobile communication system for high-speed data transmission. The AT transmits a message with a prior universal access terminal identifier (UATI) to a target access network (AN) to perform session negotiation with the target AN of the target subnet. The target AN transmits a message with the prior UATI to a target packet control function (PCF) to request retrieval of session information of the AT. The target PCF sends a request for transmission of prior session information for the AT to a source PCF of the source subnet, found using the prior UATI. The target PCF receives the prior session information from the source PCF and retrieves the session information of the AT using the received prior session information.

54 Claims, 9 Drawing Sheets

(56) References Cited

U.S. PATENT DOCUMENTS

| | | | |
|---|---|---|---|
| 7,620,017 B2* | 11/2009 | Sayeedi et al. | 370/331 |
| 7,860,061 B2* | 12/2010 | Abrol et al. | 370/331 |
| 7,979,560 B2* | 7/2011 | Jeon et al. | 709/228 |
| 8,130,719 B2* | 3/2012 | Svensson et al. | 370/331 |
| 8,498,264 B2* | 7/2013 | Ryu | 370/331 |
| 2001/0016492 A1* | 8/2001 | Igarashi et al. | 455/433 |
| 2001/0034243 A1* | 10/2001 | Masuda et al. | 455/553 |
| 2002/0068570 A1* | 6/2002 | Abrol et al. | 455/438 |
| 2002/0145990 A1* | 10/2002 | Sayeedi | 370/335 |
| 2002/0193110 A1* | 12/2002 | Julka et al. | 455/432 |
| 2003/0119482 A1* | 6/2003 | Girard | 455/411 |
| 2003/0128676 A1* | 7/2003 | Lee | 370/328 |
| 2003/0135626 A1* | 7/2003 | Ray et al. | 709/228 |
| 2004/0015607 A1* | 1/2004 | Bender et al. | 709/238 |
| 2004/0022212 A1* | 2/2004 | Chowdhury et al. | 370/329 |
| 2004/0090951 A1* | 5/2004 | Jung | 370/352 |
| 2004/0105400 A1* | 6/2004 | Jean | 370/311 |
| 2004/0203771 A1* | 10/2004 | Chang et al. | 455/435.1 |
| 2004/0218587 A1* | 11/2004 | Kim et al. | 370/352 |
| 2005/0009515 A1* | 1/2005 | Inoko | 455/426.2 |
| 2005/0013270 A1* | 1/2005 | Chang et al. | 370/328 |
| 2005/0172026 A1* | 8/2005 | Jeon et al. | 709/228 |
| 2005/0276273 A1* | 12/2005 | Oprescu-Surcobe et al. | 370/401 |
| 2006/0018280 A1* | 1/2006 | Kumar et al. | 370/331 |
| 2006/0058060 A1* | 3/2006 | Masuda et al. | 455/550.1 |
| 2006/0062180 A1* | 3/2006 | Sayeedi et al. | 370/328 |
| 2006/0083212 A1* | 4/2006 | Colban et al. | 370/349 |
| 2006/0116127 A1* | 6/2006 | Wilhoite et al. | 455/442 |
| 2006/0121942 A1* | 6/2006 | Hayashi | 455/558 |
| 2006/0165038 A1* | 7/2006 | Abrol et al. | 370/331 |
| 2006/0172738 A1* | 8/2006 | Kwon et al. | 455/439 |
| 2006/0187883 A1* | 8/2006 | Abrol et al. | 370/331 |
| 2006/0259628 A1* | 11/2006 | Vadlapudi et al. | 709/227 |
| 2006/0274692 A1* | 12/2006 | Ryu | 370/331 |
| 2007/0058585 A1* | 3/2007 | Mudigonda et al. | 370/331 |
| 2007/0143483 A1* | 6/2007 | Lim et al. | 709/227 |
| 2007/0153750 A1* | 7/2007 | Baglin et al. | 370/338 |
| 2007/0153751 A1* | 7/2007 | Svensson et al. | 370/338 |
| 2008/0026740 A1* | 1/2008 | Netanel | 455/419 |

* cited by examiner

METHOD AND SYSTEM FOR MANAGING SESSION INFORMATION IN A MOBILE COMMUNICATION SYSTEM AND APPARATUS THEREFOR

PRIORITY

This application claims the benefit under 35 U.S.C. §119(a) of an application entitled "Method and System for Managing Session Information in a Mobile Communication System and Apparatus Therefor" filed in the Korean Intellectual Property Office on Dec. 16, 2005 and assigned Serial No. 2005-124808, the entire contents of which are hereby incorporated by reference.

BACKGROUND OF THE INVENTION

1. Field of the Invention

The present invention relates generally to an apparatus and method for managing sessions in a wireless communication system. In particular, the present invention relates to a method and system for managing sessions upon a change in a subnet of an access terminal (AT) in a mobile communication system, and an apparatus therefor.

2. Description of the Related Art

In general, wireless communication systems have been developed to make up for a defect of the fixed wire network that cannot be connected up to a terminal. The typical wireless communication systems include not only the general communication system supporting voice and data services, but also wireless Local Area Network (LAN), Wireless Broadband (Wibro), and Mobile Ad-Hoc network.

A mobile communication system enables a subscriber to make a call even while on the move at high speed over a wide area. The typical mobile communication system includes a cellular system. The cellular system, proposed to overcome the service area limitation and the subscriber capacity limitation of the conventional mobile communication system, divides the full service area into a plurality of small zones, or cells, and allows two cells fully spaced apart from each other to use the same frequency band, thereby spatially reusing the frequency. Advance Mobile Phone System (AMPS) and Total Access Communication Services (TACS), which are the earliest analog cellular technologies, are called first generation (1G) mobile communication. It is difficult to accommodate the rapidly increasing number of mobile communication service subscribers only with the 1G mobile communication system. Furthermore, with the development of the communication technology, there is an increasing demand not only for the conventional voice service but also for various data services. To meet the demands, second generation (2G) digital mobile communication was proposed, which was advanced from the 1G mobile communication system. The 2G digital mobile communication system, unlike the 1G analog mobile communication system, digitalizes analog voice signals before voice coding and then performs digital modulation/demodulation using the 800 MHz frequency band. A multiple access technology is classified into a Time Division Multiple Access (TDMA) technology and a Code Division Multiple Access (CDMA). The 2G mobile communication system provides voice service and low-speed data service. The 2G system is classified into the IS-95 (CDMA) and IS-54 (TDMA) systems, both of which are adopted as standards in the United States, and the Global System for Mobile communication (GSM) system which is adopted as a standard in Europe. In addition, the Personal Communication Services (PCS) system is classified as a 2.5th generation (2.5G) mobile communication system, and uses the 1.8~2 GHz frequency band. The 2G mobile communication systems were aimed at increasing the efficiency of the mobile communication systems, while providing voice service to users. However, the advent of the Internet and users' demands for fast data service have created a need for a new wireless platform. The new wireless platform includes 3rd generation (3G) mobile communication such as International Mobile Telecommunication-2000 (IMT-2000).

A description will now be made of a 3G synchronous CDMA mobile communication system.

CDMA2000 1X service enables wireless Internet use at a rate of a maximum of 144 Kbps using the IS-95C network. This is much higher than the rate of 14.4 Kbps or 56 Kbps supported in the existing IS-95A/B networks, from which the IS-95C network evolved. Therefore, the use of the CDMA2000 1X service improves the quality of the existing voice and wireless application protocol (WAP) services and provides various multimedia services (audio on demand (AOD), video on demand (VOD), and the like). The IS-95A/B networks are names of base station networks. The IS-95B network can support a wireless data rate of a maximum of 64 Kbps, whereas the IS-95C network for CDMA2000 1X supports a data rate of a maximum of 144 Kbps. A CDMA2000 1X mobile phone, if any, may access an available IS-95A or IS-95B network, if no IS-95C network is installed in the corresponding area.

Despite development of the mobile communication technology, users still require even higher-quality data services. To meet these requirements, CDMA 2000 1x Evolution-Data Only (EV-DO) technology, also known as High Rate Packet Data (HRPD) technology, has been proposed. The CDMA 2000 1x EV-DO is a dedicated protocol for packet data transmission, which is fully different from the existing IS-2000 radio protocol, and supports a data rate of a maximum of 2.4 Mbps in the forward direction. The CDMA 2000 1x EV-DO requires a separate base station apparatus, different from that of the IS-2000, but shares the other system and network elements with the IS-2000.

Because the service received at the terminal from the system is superior to the service received at the system from the terminal due to the characteristics of packet data, CDMA 2000 1x EV-DO has a structure in which the forward channel speed is different from the reverse channel speed. When space diversity is not used for the terminal, CDMA 2000 1x EV-DO has an asymmetrical data rate structure in which a forward data rate is possible up to a maximum of 2.4 Mbps while a reverse data rate is possible up to a maximum of 153.6 Kbps.

IS-2000 has a limitation in the maximum data rate because it basically realizes high-speed packet data service based on a voice protocol. IS-2000 Release 0 can transmit packet data at up to 153.6 Kbps in a wireless section. But, the service provider can only support a data rate of up to 64 Kbps for Video-On-Demand (VOD) and a data rate of up to 32 Kbps on average for the wireless Internet because of the capacity problem in the wireless section. However, the CDMA 2000 1x EV-DO system basically aimed at packet data service cannot fully solve the capacity problem in the wireless section.

CDMA 2000 1x EV-DO, which is a protocol optimized only for the high-speed packet transmission, uses 1.25 MHz CDMA channels having the same frequency band as that of the current cdma2000 system. In particular, CDMA 2000 1x EV-DO dynamically assigns a data rate of each subscriber in the wireless section, and maximizes the efficiency of the wireless section and the system by making the best use of the unique characteristics of the packet data.

The CDMA 2000 1x EV-DO system is called an HRPD system, and in the CDMA 2000 1x EV-DO system, an access terminal (AT) uses a temporary identifier, called a Unicast Access Terminal Identifier (UATI). The AT is assigned a unique UATI from a Packet Control Function (PCF) in units of subnets, and performs a session negotiation process, an authentication process, a connection setup process, and a Point-to-Point Protocol (PPP) setup process, using the assigned UATI. When the AT in a dormant state moves to a new subnet, it is assigned a new UATI and acquires session information from the old subnet.

In this specification, the old subnet in which the AT was located before its movement will be referred to as a "source subnet" and the new subnet to which the AT has moved will be referred to as a "target subnet." A definition of the terms "source" and "target" can be also be used for an access network (AN) and the PCF, also known as a packet controller.

In the general CDMA 2000 1x EV-DO (HRPD), when an AT moves from a source subnet to a target subnet with the radio link lost or with its power off, and newly accesses the target subnet, because an AN of the target subnet has no session information for the corresponding AT, the AT must perform a new session negotiation process with the target AN and perform again the connection setup process.

In addition, when session information for the AT is continuously stored in a source PCF, the session information is deleted only by an inner timer. This routine is inefficient because the session information is unnecessarily stored until the timeout expires, taking an operation range of the timer into account.

Accordingly, there is a need for an improved method and system for managing session information.

SUMMARY OF THE INVENTION

Exemplary embodiments of the present invention address at least the above problems and/or disadvantages and provide at least the advantages described below. Accordingly, an aspect of the present invention is to provide a method and system for managing session information of an access terminal (AT) in a mobile communication system for high-speed data transmission, and an apparatus therefor.

It is another object of the present invention to provide a method and system for deleting session information of an AT, stored in a source subnet, when the AT moves to a target subnet in a mobile communication system for high-speed data transmission, and an apparatus therefor.

It is further another object of the present invention to provide a method and system for preventing unnecessary session negotiation with a target access network (AN) when an AT moves to a new target subnet in a mobile communication system for high-speed data transmission, and an apparatus therefor.

According to one exemplary aspect of the present invention, there is provided a method for managing session information of an access terminal (AT) that has moved from a source subnet to a target subnet in a mobile communication system for high-speed data transmission. The method comprising the steps of: transmitting, by the AT, a message with an prior universal access terminal identifier (UATI) to a target access network (AN) to perform session negotiation with the target AN of the target subnet; transmitting, by the target AN, a message with the old UATI to a target packet control function (PCF) to request retrieval of session information of the AT; sending, by the target PCF, a request for transmission of prior session information for the AT to a source PCF of the source subnet, found using the old UATI; and receiving, by the target PCF, the prior session information from the source PCF and retrieving the session information of the AT using the received prior session information.

According to another exemplary aspect of the present invention, there is provided a system for managing session information of an access terminal (AT) that has moved from a source subnet to a target subnet in a mobile communication system for high-speed data transmission. The system comprises a target access network (AN) for establishing a traffic channel to the AT and sending a request for retrieving the session information of the AT to a target packet control function (PCF) of the target subnet upon receiving from the AT a message with an old universal access terminal identifier (UATI) of the AT for session negotiation; a source PCF of the source subnet, for including therein prior session information of the AT; and the target PCF for, upon receiving the request for retrieving the session information of the AT from the target AN, sending a request for transmission of the session information to the source PCF found using the old UATI, and retrieving the session information of the AT by receiving the prior session information from the source PCF.

According to another exemplary aspect of the present invention, there is provided a method for managing session information of an access terminal (AT) that has moved from a source subnet to a target subnet in a mobile communication system for high-speed data transmission. The method comprises the steps of: acquiring, by a target access network (AN), a hardware identifier (ID) from the AT, and performing session
negotiation with the AT to receive an old universal access terminal identifier (UATI) of the AT; transmitting, by the target AN, to a target packet control function (PCF) of the target subnet a first message including therein the hardware ID and the old UATI as a session state information record (SSIR) of the AT to request deletion of prior session information of the AT; upon receiving the first message, finding, by the target PCF, a source PCF of the source subnet based on the old UATI and transmitting a second message with the SSIR to the source PCF to request deletion of the prior session information for the AT; upon receiving the second message, inquiring, by the source PCF, the prior session information for the AT, deleting the prior session information, and delivering to the target PCF a third message indicating the deletion of the prior session information; upon receiving the third message, transmitting, by the target PCF, to the target AN a fourth message indicating the deletion of the prior session information for the AT; and after transmitting the first message, delivering, by the target AN, a fifth message indicating nonuse of the prior session information to the AT.

According to yet another exemplary aspect of the present invention, there is provided a system for managing session information of an access terminal (AT) that has moved from a source subnet to a target subnet in a mobile communication system for high-speed data transmission. The system comprises a target access network (AN) for establishing a traffic channel to the AT, performing session negotiation to the AT, transmitting to a target packet control function (PCF) a first message including a hardware identifier (ID) acquired from the AT and an old universal access terminal identifier (UATI) of the AT as a session state information record (SSIR) of the AT to instruct deletion of prior session information of the AT, performing new session negotiation with the AT, and receiving from the target PCF a fourth message indicating deletion of the prior session information; a source PCF of the source subnet for storing the prior session information of the AT; and the target PCF for, upon receiving the first message from the target AN, finding the source PCF using the old UATI included in the first message, determining whether predetermined information indicating deletion of the session information of the AT stored in the source PCF is set in the first message, transmitting to the source PCF a second message indicating deletion of the prior session information of the AT if the predetermined information is set in the first message, and receiving a third message indicating deletion of the prior session information from the source PCF.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

Figure 1:
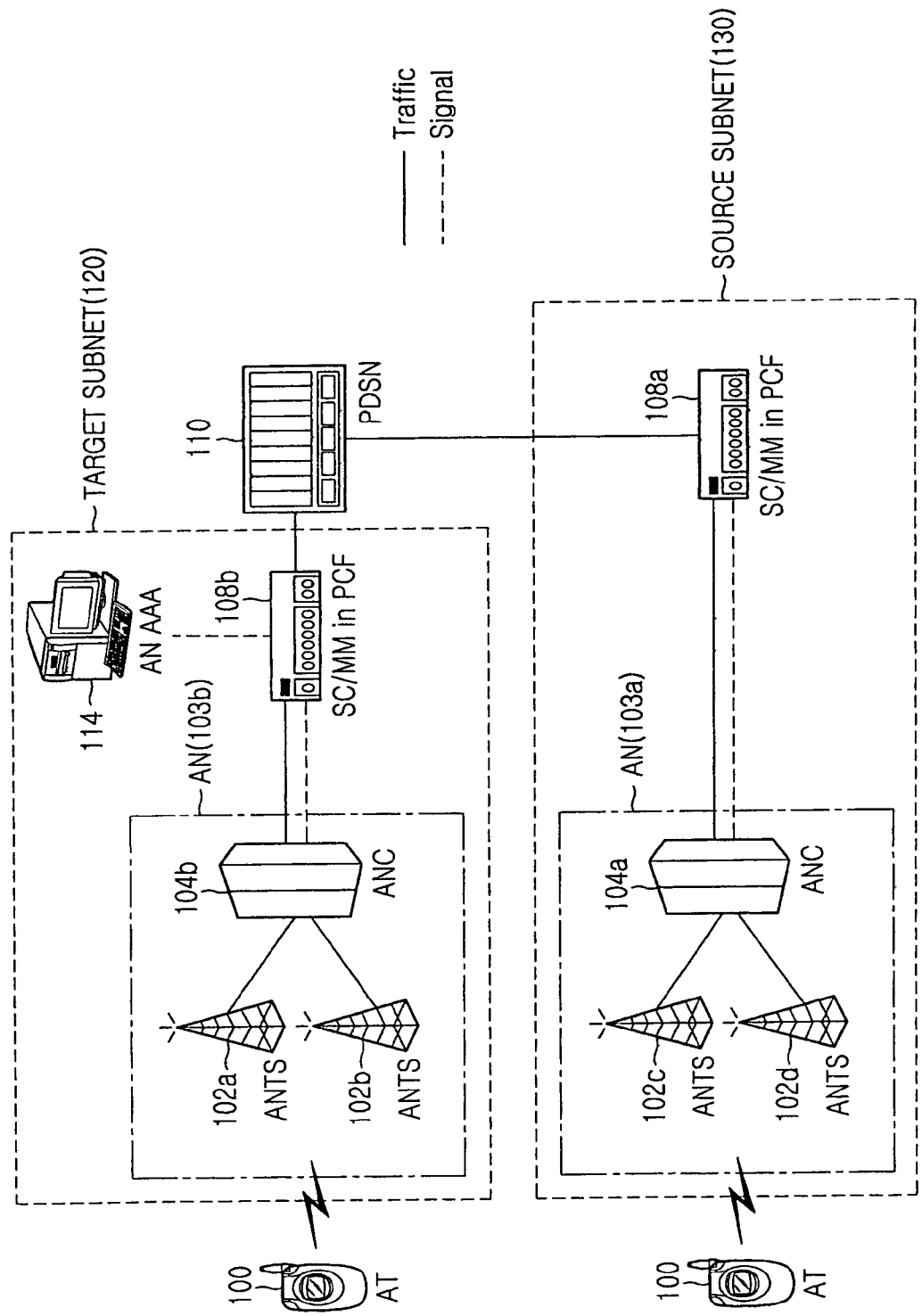
FIG. 1 is a diagram illustrating a mobile communication system for high-speed data transmission which is an exemplary embodiment of the present invention.

Exemplary embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

In the following description, a 1x EV-DO (HRPD) system will be referred to as a mobile communication system for high-speed data transmission. In addition, the term "session information" as used herein refers to all information used by an access terminal (AT) to generate and maintain a call in a wireless section and the system. For example, the session information includes a parameter needed for access channel authentication, used during transmission of a signal message through an access channel in the wireless section, a sequence number value of a signal message, a Keep Alive timer value needed to extend and maintain a session, various Quality-of-Service (QoS) information, and a permanent number of an AT, used in the system.

FIG. 1 is a diagram illustrating an exemplary mobile communication system for high-speed data transmission of the present invention.

Referring to FIG. 1, an AT 100 is connected to Access Network Transmission Systems (ANTSs; or base stations) 102a, 102b, 102c and 102d (102) that process radio links and radio signals with an IS-856 radio access standard that defines a signaling procedure for processing origination and termination of a packet call, a packet delivery procedure, and Medium Access Control (MAC). The ANTS 102 is connected to Access Network Controllers (ANCs) 104a and 104b (104) that handle call processing, a Selection Function (SF), and a Radio Link Protocol (RLP). As shown in FIG. 1, the ANC 104 can be connected to two or more ANTSs. The ANC 104 is connected to a Packet Data Serving Node (PDSN) 110 of a Data Core Network (DCN), which takes charge of authentication, IP address assignment, routing function, and accounting information transmission for the AT 100, via Packet Control Functions (PCFs) 108a and 108b (108).

The PCF 108 connects the ANC 104 to the PDSN 110 to take charge of a user traffic delivery function between the ANC 104 and the PDSN 110, and includes a Session Control/Mobility Management (SC/MM) that takes change of session management, mobility management, and authentication for the AT 100. Although the SC/MM is included in the PCF 108 in an exemplary case of FIG. 1, the SC/MM may be constructed separately from the PCF 108. It will be assumed herein that the SC/MM is included in the PCF 108.

The SC/MM included in the PCF 108 performs mobility management on a CDMA 2000 1x EV-DO subscriber, performs assignment request process on a Universal Access Terminal Identifier (UATI) of the ANC 104 for a subnet zone, delivers International Mobile Subscriber Identity (IMSI) and session information for the AT 100, and performs paging according to a position when there is a paging request for the AT 100.

Herein, the ANC 104 and the ANTS 102 constitute an Access Network (AN) 103a and 103b (103).

The PCF 108 is connected to an Access Network (AN)-Authentication Authorization Accounting (AAA) 114, which is a network server that takes charge of authentication, access right, and accounting functions for the users.

In FIG. 1, reference numeral 103a denotes a source AN, reference numeral 103b denotes a target AN, reference numeral 108a denotes a source PCF, reference numeral 108b denotes a target PCF, reference numeral 120 denotes a target subnet, and reference numeral 130 denotes a source subnet.

A description will now be made of an exemplary concept of the present invention. An exemplary process of preventing unnecessary session setup between an AN and an AT, when the AT moves to a target subnet with the radio link lost or with its power off, in the mobile communication system for high-speed data transmission shown in FIG. 1, is described with reference to the accompanying drawing.

In a first exemplary embodiment of the present invention, when an AT 100, after moving to a target subnet 120, transmits a PriorSession Attribute defined in, for example, 3GPP2 C.S0024-0 to a target AN 103b, the target AN 103b delivers the PriorSession Attribute to a target PCF 108b with a Session State Information Record (SSIR), and the target PCF 108b finds a source PCF 108a based on the SSIR. The target PCF 108b retrieves prior session information of the AT 100 from the source PCF 108a, and transmits the prior session information to the target AN 103b. Therefore, the target AN 103b can reuse the existing session information for the AT 100, making it possible to omit unnecessary session negotiation between the AT 100 that moved to the target subnet 120, and the target AN 103b.

In a second exemplary embodiment of the present invention, when a target AN 103b has failed to retrieve prior session information within a predetermined time or does not use prior session information, the target AN 103b delivers the PriorSession Attribute to a target PCF 108b with an SSIR, and the target PCF 108b finds a source PCF 108a based on the SSIR. The target PCF 108b transmits a message for instructing the source PCF 108a to delete the prior session information for the corresponding AT 100, thereby preventing the source PCF 108a from storing unnecessary session information. A detailed description of the SSIR will be made later.

The first and second exemplary embodiments of the present invention will specify a message transmission/reception procedure for a session information retrieval/deletion operation between source/target ANs 103a and 103b and source/target PCFs 108a and 108b when a PriorSession Attribute is used in a CDMA 2000 1x EV-DO (HRPD) system, and will propose exemplary methods for providing fast service using the specified procedure.

The messages used in the following exemplary embodiments can basically include the messages defined in an HRPD IOS standard.

Figure 2:
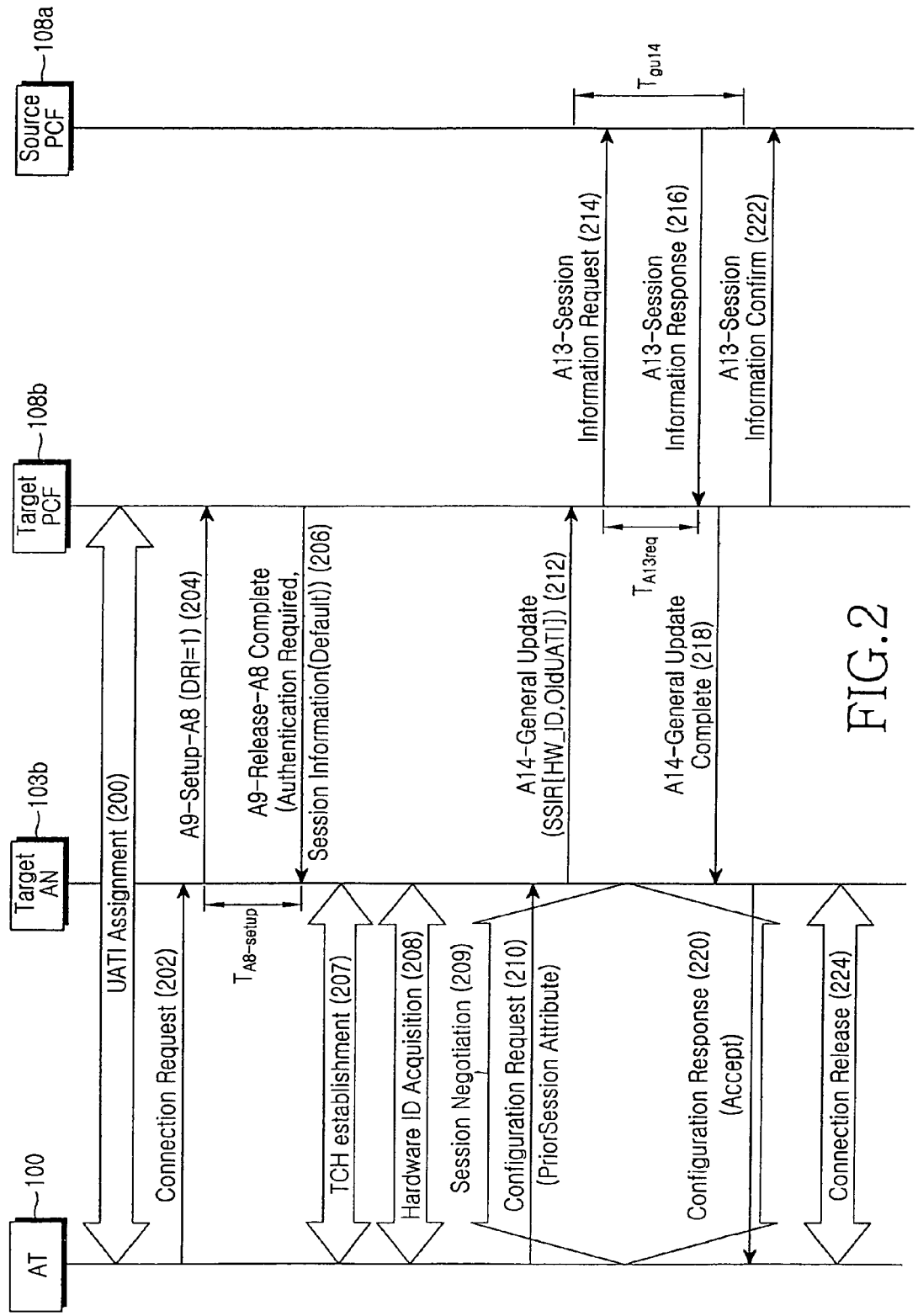
FIG. 2 is a call flow diagram between network elements for retrieving prior session information when an AT moves between subnets with its radio link lost according to a first exemplary embodiment of the present invention.

FIG. 2 is a call flow diagram between network elements for retrieving prior session information when an AT moves between subnets with its radio link lost according to an exemplary embodiment of the present invention.

Referring to FIG. 2, in step 200, an AT 100 sends a request for an available temporary identifier UATI to a target subnet 120 which is a new subnet, and a target PCF 108b assigns a new UATI to the AT 100. In step 202, the AT 100 transmits a Connection Request message to a target AN 103b using the assigned UATI to request connection setup. In step 204, the target AN 103b delivers an A9-Setup-A8 message with the Data Ready Indicator (DRI) of A9 Indicator set to '1' to the target PCF 108b to request A8 connection setup and starts timer TA8-setup.

In step 206, the target PCF 108b receiving the A8 connection setup request checks a state of the AT 100 and detects a need for authentication of the AT 100. Further, the target PCF 108b delivers information indicating the need for authentication of the AT 100 and basic information for traffic channel (TCH) establishment to the target AN 103b. At this time, target AN 103b stops timer TA8-setup. In step 207, the AT 100 and the target AN 103b establish a TCH there between.

If a TCH is established between the AT 100 and the target AN 103b in step 207, the AT 100 and the target AN 103b perform a Hardware ID Acquisition procedure in step 208. In step 208, the target AN 103b transmits a Hardware ID Request message to the AT 100 to acquire a Hardware ID of the AT 100, and the AT 100 delivers a Hardware ID Response to the target AN 103b. Through this process, the AT 100 delivers its own Hardware ID (HW_ID) to the target AN 103b. The acquired Hardware ID is used to check for prior session information.

In step 209, a Session Negotiation process is performed between the AT 100 and the target AN 103b. The Session Negotiation process includes steps 210 and 220, and a description thereof will be made below.

In step 210, the AT 100 transmits a Configuration Request message with PriorSession Attribute to the target AN 103b. The PriorSession Attribute includes therein information on a source PCF 108a. In step 212, the target AN 103b delivers old temporary ID information Old_UATI included in the PriorSession Attribute received from the AT 100 and the Hardware ID HW_ID, a unique number, such as an Electronic Serial Number (ESN) of the AT 100, acquired in step 208, to the target PCF 108b in the form of the SSIR. This is achieved through an A14-General Update message. The target AN 103b also starts timer Tgu14.

In step 214, the target PCF 108b finds a source PCF 108a using an 8-bit color code of the Old_UATI indicating subnet information included in the received A14-General Update message. Further, the target PCF 108b transmits an A13-Session Information Request message to the source PCF 108a to retrieve prior session information of the AT 100 from the source PCF 108a using the old temporary ID information Old_UATI included in the received A14-General Update message. Also, the target PCF 108b starts timer TA 13 req.

In step 216, the source PCF 108a transmits prior session information of the AT 100 for the Old_UATI included in the A13-Session Information Request message, using an A13-Session Information Response message.

In addition to the foregoing method in which the target PCF 108b retrieves the prior session information of the AT 100 from the source PCF 108a using the Old_UATI, there is another possible method in which the target PCF 108b retrieves the prior session information for the AT 100 from the source PCF 108a using the A13-Session Information Request message including therein the Hardware ID acquired from the AT 100.

In step 216, the source PCF 108a checks validity of the A13-Session Information Request message received from the target PCF 108b using a security layer packet. This is a process of determining whether the AT 100 can receive service in the target subnet 120. The HW_ID of the AT 100 can be optionally included in the A13-Session Information Response message before being transmitted. The target PCF 108b stops timer TA13req. If the HW_ID for the AT 100 is included in the A13-Session Information Response message, the target PCF 108b compares in step 218 the Hardware ID received from the AT 100 in step 212 with the Hardware ID received from the source PCF 108a in step 216. If the two Hardware IDs are identical to each other, the target PCF 108b sends an A14-General Update Complete message to the target AN 103b to notify the successful receipt of prior session information of the AT 100 from the source PCF 108a. At this time, the target AN 103b stops timer Tgu14.

Thereafter, in step 220, the target AN 103b includes an 'Accept' indication in a Configuration Response message and delivers the Configuration Response message to the AT 100.

In step 222, the target PCF 108b sends an A13-Session Information Confirm message to the source PCF 108a to notify the successful receipt of the session information, and the source PCF 108a deletes the session information stored therein upon receiving the A13-Session Information Confirm message.

In step 224, the target AN 103b and the AT 100 release the connection established in step 208.

Although not illustrated in FIG. 2, when a TCH is established again between the AT 100 and the target AN 103b after the connection between the AT 100 and the target AN 103b is released in step 224, the TCH is established using the prior session information acquired in the Session Negotiation process of step 209.

Figure 3:
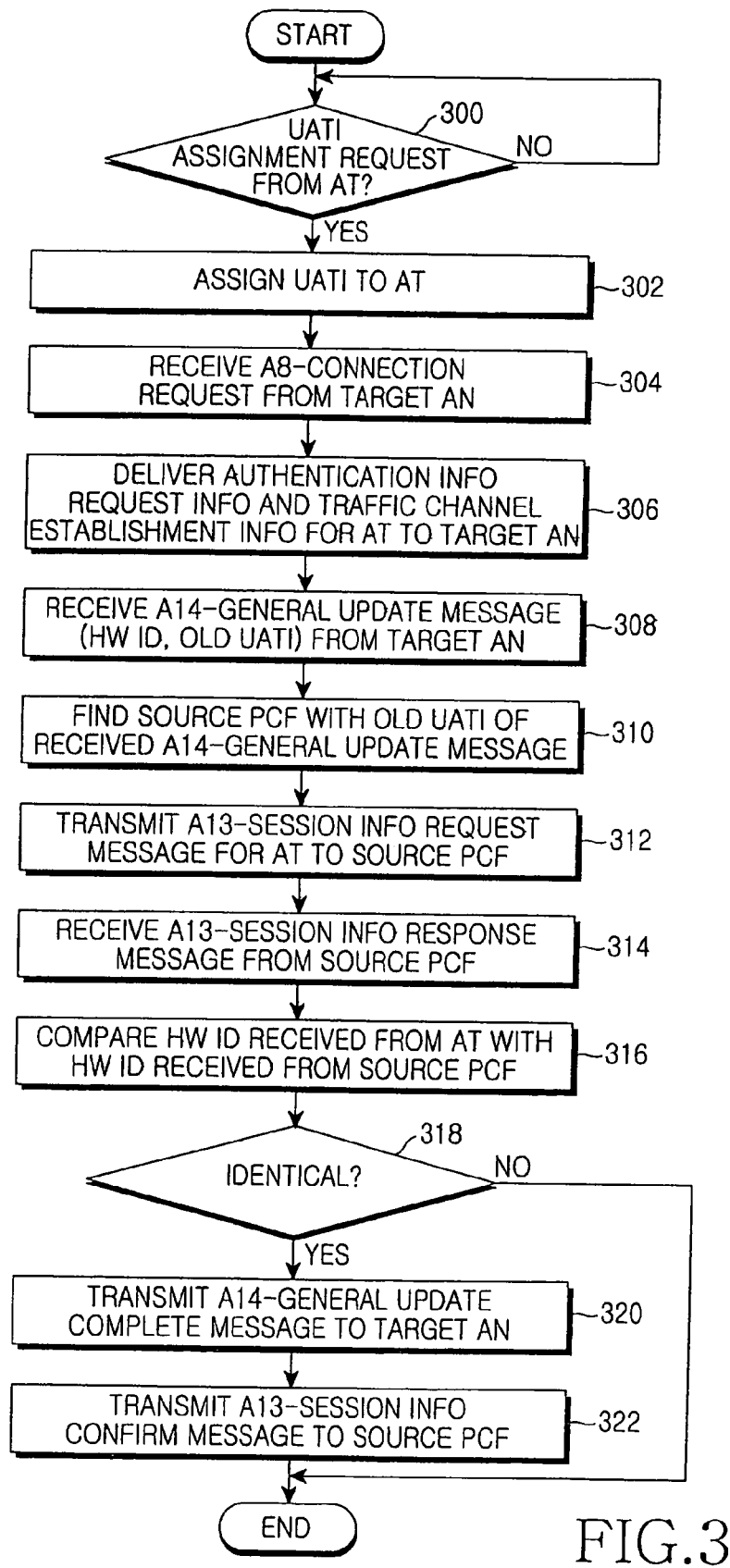
FIG. 3 is a flowchart illustrating a process in which a target PCF retrieves prior session information for an AT from a source PCF according to the first exemplary embodiment of the present invention.

FIG. 3 is a flowchart illustrating a process in which a target PCF 108b retrieves prior session information for an AT from a source PCF according to the first exemplary embodiment of the present invention.

Referring to FIG. 3, in step 300, a target PCF (also known as a packet controller) 108b determines whether there is any UATI assignment request from an AT 100. If there is a UATI assignment request, the target PCF 108b assigns a UATI to the AT 100 in step 302.

If the target PCF 108b receives from a target AN 103b an A8-Connection Request message in which a DRI for A8 connection setup is set to '1' in step 304, the target PCF 108b delivers in step 306 authentication information request information and TCH establishment information for the AT 100 to the target AN 103b.

In step 308, the target PCF 108b receives from the target AN 103b an A14-General Update message including therein a Hardware ID and old temporary ID information Old_UATI in the form of an SSIR. In step 310, the target PCF 108b finds a source PCF 108a with a color code included in the Old_UATI.

In step 312, the target PCF 108b transmits an A13-Session Information Request message to the source PCF 108a to request prior session information for the AT 100. If the target PCF 108b receives from the source PCF 108a an A13-Session Information Response message including session information of the AT 100 and a Hardware ID of the AT 100 in step 314, the target PCF 108b compares in step 316 the Hardware ID received from the AT 100 with the Hardware ID received from the source PCF 108a, in order to determine whether the session information provided from the source PCF 108a is for the corresponding AT 100.

In step 318, the target PCF 108b determines whether the two Hardware IDs are identical to each other. If the two Hardware IDs are identical to each other, the target PCF 108b transmits an A14-General Update Complete message to the target AN 103b in step 320, determining that the session information provided from the source PCF 108a is for the corresponding AT 100. In step 322, the target PCF 108b transmits an A13-Session Information Confirm message to the source PCF 108a, if it has failed to retrieve prior session information of the AT 100 within a predetermined time or does not use the prior session information.

Figure 4:
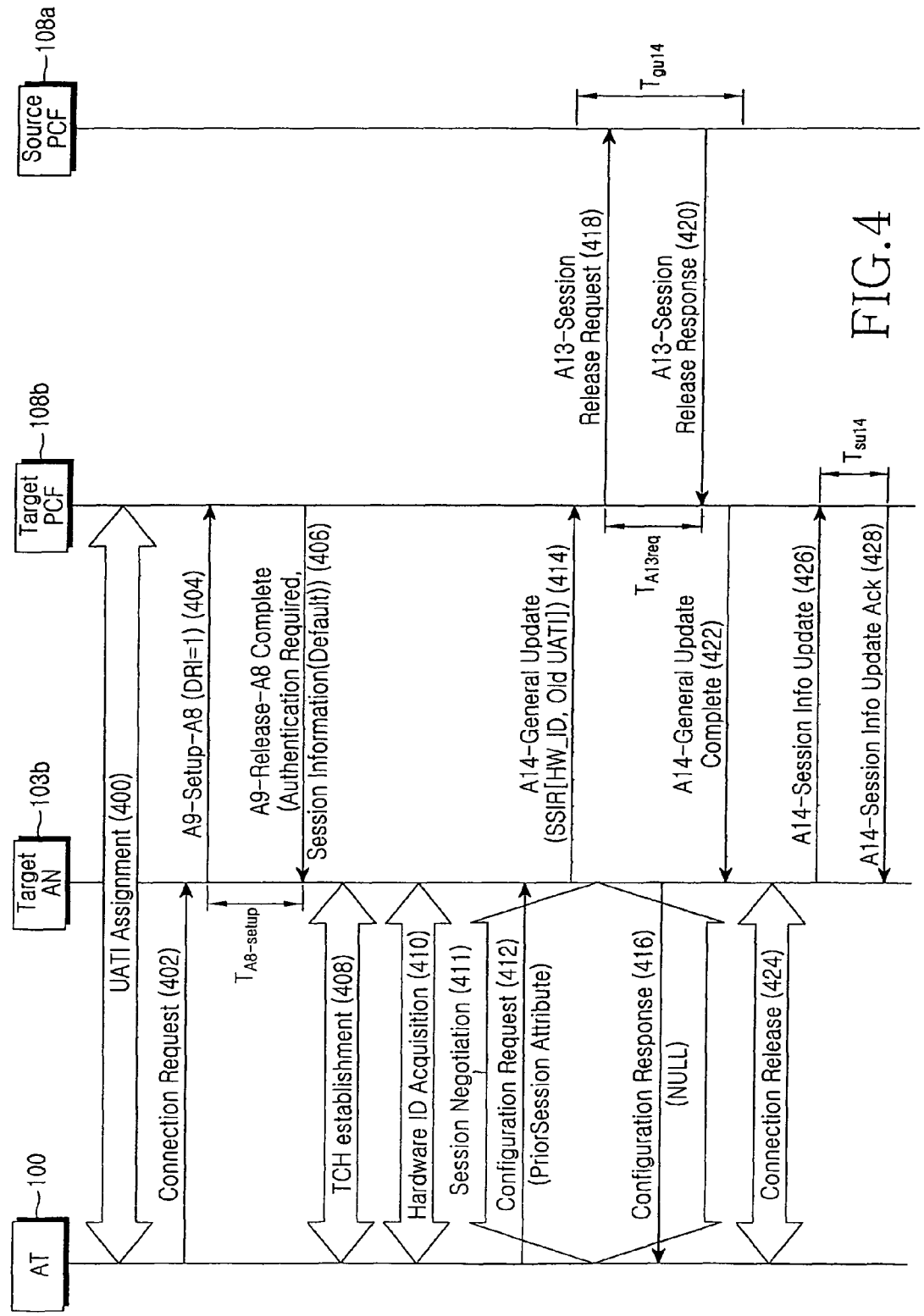
FIG. 4 is a call flow diagram between network elements for deleting prior session information of an AT in a source PCF according to a second exemplary embodiment of the present invention.

FIG. 4 is a call flow diagram between network elements for deleting prior session information of an AT in a source PCF according to a second exemplary embodiment of the present invention.

Referring to FIG. 4, in step 400, an AT 100 sends a request for an available temporary identifier UATI to a target subnet 120 which is a new subnet, and a target PCF 108b assigns a new UATI to the AT 100. In step 402, the AT 100 transmits a Connection Request message to a target AN 103b using the assigned UATI to request connection setup. In step 404, the target AN 103b delivers an A9-Setup-A8 message with the DRI of A9 Indicator set to '1' to the target PCF 108b to request A8 connection setup and the target AN 103b starts timer TA8-setup.

In step 406, the target PCF 108b receiving the A8 connection setup request checks a state of the AT 100 and detects a need for authentication of the AT 100. Further, the target PCF 108b delivers information indicating the need for authentication of the AT 100 and basic information for TCH establishment to the target AN 103b. At this time, the target AN 103b stops timer TA8-setup. In step 408, the AT 100 and the target AN 103b establish a TCH there between. In step 410, the AT 100 and the target AN 103b perform a Hardware ID Acquisition procedure. The acquired Hardware ID is used for identifying the retrieved prior session information.

In step 411, a Session Negotiation process is performed between the AT 100 and the target AN 103b. The Session Negotiation process includes steps 412 and 416, and a description thereof will be made below.

In step 412, the AT 100 transmits a Configuration Request message with PriorSession Attribute to the target AN 103b. The PriorSession Attribute includes old temporary ID information Old_UATI including therein information on a source PCF 108a.

According to the second exemplary embodiment of the present invention, because the target PCF 108b desires to delete the prior session information for the AT 100 stored in the source PCF 108a by means of an operator or the communication system or a service provider instead of retrieving the prior session information for the AT 100 from the source PCF 108a, the target AN 103b sets in step 414 a Session Removal Indicator in an A14 Indicator to '1' and transmits the Session Removal Indicator through an A14-General Update message to the target PCF 108b. The A14-General Update message includes therein old temporary ID information Old_UATI and HW_ID in the form of the SSIR. At this time, target AN 103b starts timer Tgu14.

In step 416, the target AN 103b includes 'NULL' in a Configuration Response message before transmission to the AT 100 to indicate that it will not use the PriorSession Attribute. If the AT 100 receives the Configuration Response message with 'NULL' delivered by the target AN 103b in step 416, new Session Negotiation other than the Session Negotiation of step 411 is performed between the AT 100 and the target AN 103b. If the Session Negotiation of step 411 is completed, the connection is released in step 424.

A format of the A14 Indicator in which the Session Removal Indicator is included according to the second exemplary embodiment of the present invention is shown in Table 1 below.

TABLE 1

| 7 | 6 | 5 | 4 | 3 | 2 | 1 | 0 | Octet |
|---|---|---|---|---|---|---|---|---|
| A14 Element Identifier = [82H] | | | | | | | | 1 |
| Length = [01H] | | | | | | | | 2 |
| Reserved | Session Removal Indicator | SSIR Required | Keep Alive Indicator | Data Ready Indicator | Paging Type Indicator | A15 Paging Inhibited | Authentication Required | 3 |

To provide a better understanding of the present invention, a brief description will be made of the fields included in the A14 Indicator of Table 1.

In Table 1, Length is a binary number and includes the number of octets of the A14 Indicator information element (IE), and if the Authentication Required field is set to '1', it means that an AN should authenticate an AT.

If the A15 Paging Inhibited field is set to '1', the AN does not transmit an A15-Paging Request message or an A15-1x Service Transmission message to its neighbor ANs.

If the Paging Type Indicator field is set to '1', the AN does not transmit an A14-Paging Response message to a PCF. Instead, the AN transmits an A14-Paging Request Ack message to the PCF.

If the Data Ready Indicator (DRI) field is set to '1' when the PCF has data to transmit, the AN attempts to establish an A8 connection.

The Keep Alive Indicator field is used to inform the PCF that the AT has initialized a Keep Alive procedure with the AN. If this field is set to '1', it indicates that the Keep Alive procedure was performed.

If the SSIR Required field is set to '1', the PCF should send the SSIR with an A14-General Update Complete message.

The second exemplary embodiment of the present invention includes the Session Removal Indicator field in the A14 Indicator as shown in Table 1, and the target AN 103b transmits to the target PCF 108b an A14-General Update message including therein the SSIR and the A14 Indicator with Session Removal Indicator field set to '1'. Then the target PCF 108b requests the source PCF 108a to delete the session information related to the AT 100, and this process will be described in step 418.

In step 418, the target PCF 108b finds the source PCF 108a based on the Old_UATI included in the A14-General Update message, and transmits an A13-Session Release Request message to the source PCF 108a to request the source PCF 108a to delete the prior session information of the AT 100 for the HW_ID. At this time, target PCF starts timer TA 13req.

In step 420, the source PCF 108a receiving the A13-Session Release Request message deletes the prior session information of the AT 100, and transmits an A13-Session Release Response message to the target PCF 108b to indicate the deletion of the prior session information for the AT 100. At this time, target PCF stops timer TA13req.

In step 422, the target PCF 108b transmits an A14-General Update Complete message to the target AN 103b to notify the target AN 103b of the deletion of the prior session information for the AT 100. At this time, target AN 103b stops timer Tgu14. In step 424, the AT 100 and the target AN 103b release the connection if the Session Negotiation process in step 411 is completed.

In step 426, the target AN 103b delivers the session negotiation result to the target PCF 108b, and the target PCF 108b updates the session information. This becomes possible by transmitting an A14-Session Information Update message from the target AN 103b to the target PCF 108b. Also, the target AN 103b starts timer Tsu14.

In step 428, the target PCF 108b notifies the target AN 103b of the update of the session information for the AT 100 using an A14-Session Information Update Ack message. At this time, the target AN 103b stops timer Tsu14.

Figure 5A:
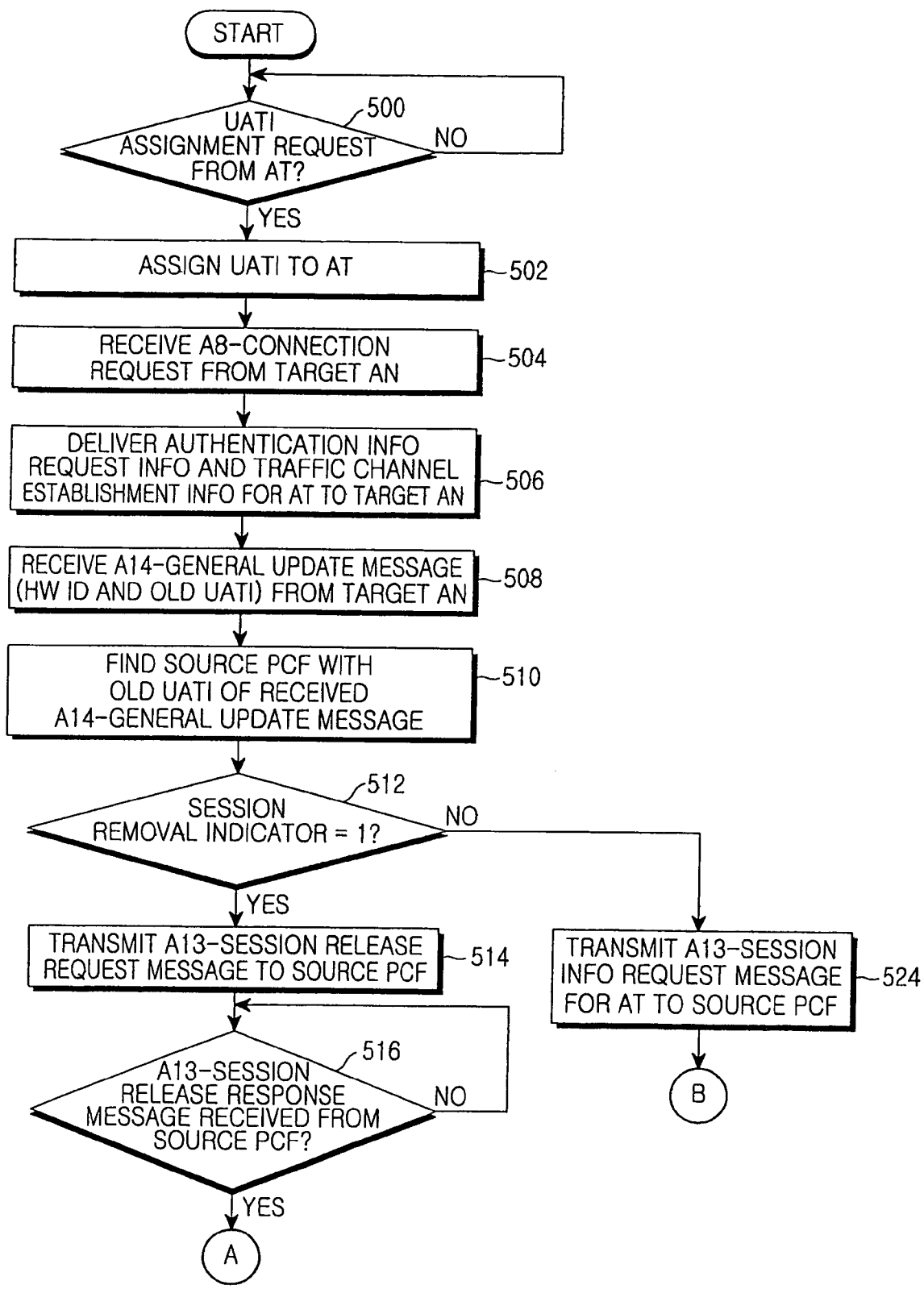
FIGS. 5A and 5B are flowcharts illustrating a process of deleting session information of an AT stored in a source PCF by a target PCF according to the second exemplary embodiment of the present invention.
Figure 5B:
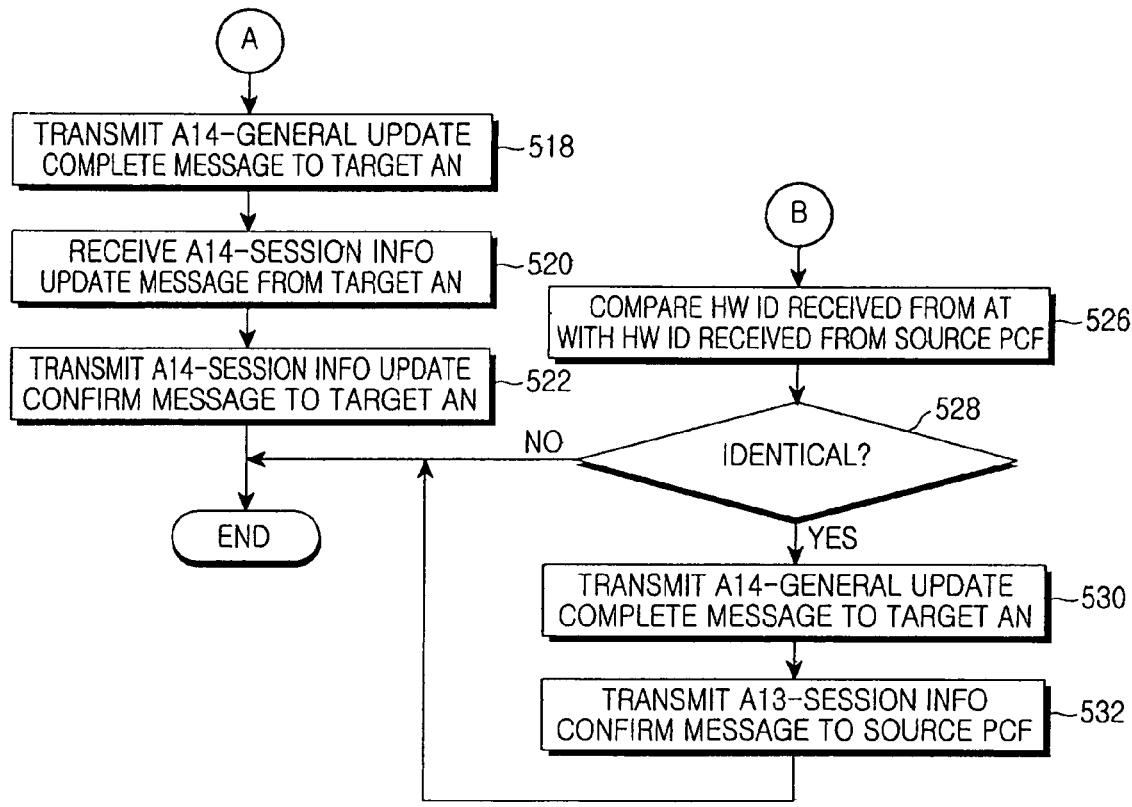

FIGS. 5A and 5B are flowcharts illustrating a process of deleting session information of an AT stored in a source PCF by a target PCF according to the exemplary embodiment of the present invention.

Referring to FIGS. 5A and 5B, a target PCF 108b determines in step 500 whether there is any UATI assignment request from an AT 100. If there is a UATI assignment request, the target PCF 108b assigns a UATI to the AT 100 in step 502.

If the target PCF 108b receives from a target AN 103b an A8-Connection Request message in which a DRI for A8 connection setup is set to '1' in step 504, the target PCF 108b delivers in step 506 authentication information request information and TCH establishment information for the AT 100 to the target AN 103b.

If the target PCF 108b receives in step 508 an A14-General Update message including with Old_UATI from the target AN 103b, the target PCF 108b finds a source PCF 108a based on the Old_UATI information in step 510.

In step 512, the target PCF 108b determines whether a Session Removal Indicator of an A14 Indicator in the received A14-General Update message is set to '1'. If the Session Removal Indicator is set to '1' in step 512, the target PCF 108b proceeds to step 514 where it transmits an A13-Session Release Request message to the source PCF 108a to request deletion of the prior session information for the AT 100.

In step 516, the target PCF 108b determines whether there is any A13-Session Release Response message received from the source PCF 108a. If there is an A13-Session Release Response message received from the source PCF 108a, the target PCF 108b transmits in step 518 an Al14-General Update Complete message to the target AN 103b to indicate that the prior session information of the AT 100 was deleted from the source PCF 108a. In step 520, the target PCF 108b receives from the target AN 103b an A14-Session Information Update message including therein the session information newly negotiated between the target AN 103b and the AT 100. In step 522, the target PCF 108b transmits an A14-Session Information Update Ack message to the target AN 103b to indicate the update of the session information for the AT 100.

However, if it is determined in step 512 that the Session Removal Indicator of the A14 Indicator in the A14-General Update message is not set to '1', the target PCF 108b proceeds to step 524 where it performs step 312 of FIG. 3 described in the first exemplary embodiment of the present invention. That is, an operation of steps 526 to 532 of FIG. 5 is equal to the operation of steps 316 to 322 of FIG. 3, so a detailed description thereof will be omitted.

Figure 6:
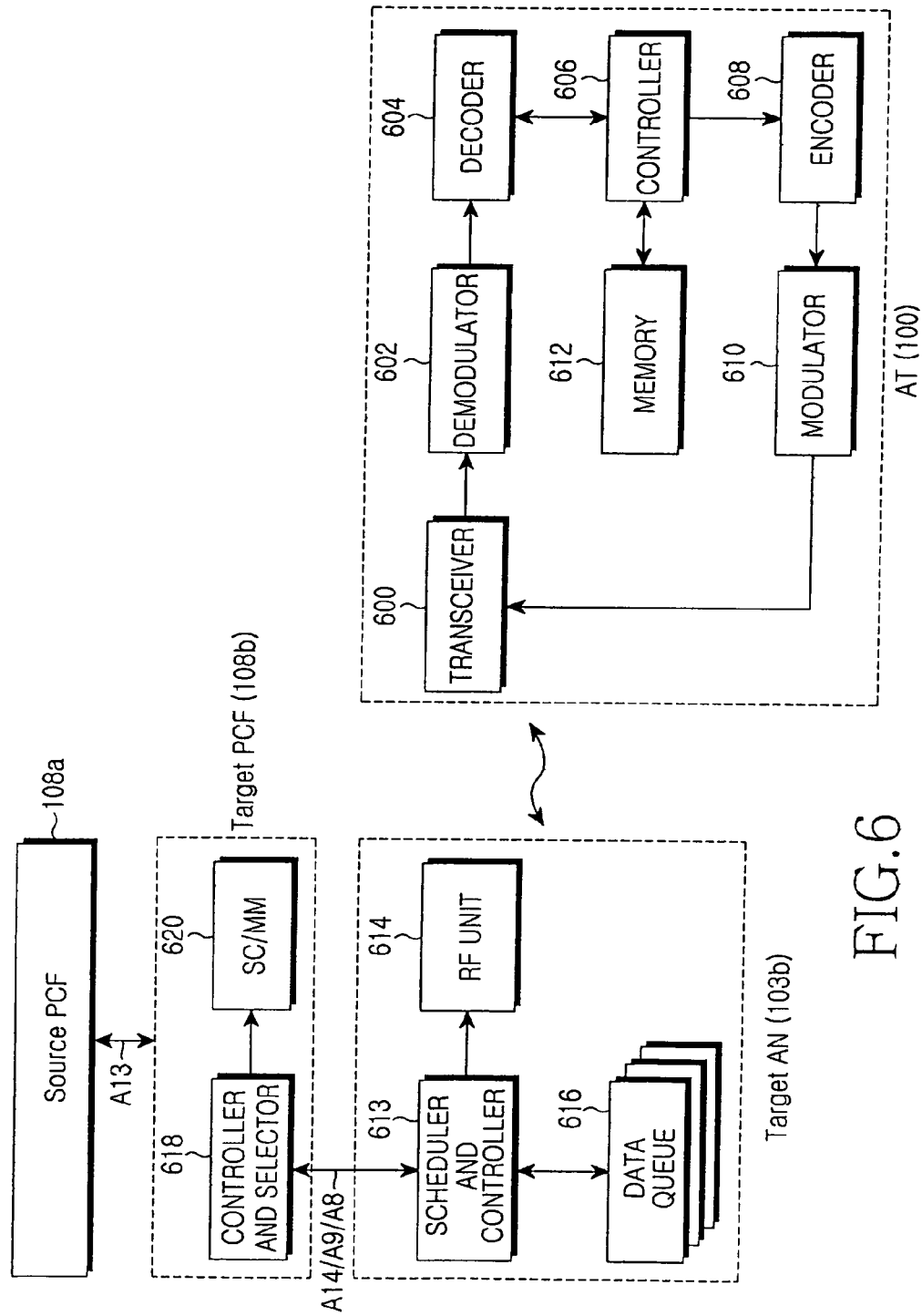
FIG. 6 is a block diagram illustrating structures of an AT, an AN and a PCF for high-speed data transmission according to the first and second exemplary embodiments of the present invention.

FIG. 6 is a block diagram illustrating structures of an AT, an AN and a PCF for high-speed data transmission according to first and second embodiments of the present invention.

Referring to FIG. 6, an AT 100 includes a controller 606 for performing the overall control of the AT 100 and negotiating session information to be used during communication with PCFs 108a and 108b or ANs 103a and 103b according to an exemplary embodiment, a memory 612 for storing the negotiated session information and transmission/reception user data, an encoder 608 for encoding the user data and a generated message, a modulator 610 for modulating the coded user data and message, and a transceiver 600 for transmitting and receiving the user data and the generated message to/from a base station over a wireless channel. Further, the AT 100 includes a demodulator 602 for demodulating user data and message received via the transceiver 600, and a decoder 604 for decoding the demodulated user data and message.

The AN 103b includes a radio frequency (RF) unit 614 for transmitting/receiving user data and a message, a data queue 616 for storing received user data and message, and a scheduler and controller 613 for selectively controlling data for a particular user and particular queue before transmission, taking into account the amount of data for each individual queue, and channel conditions, service characteristics and fairness of ATs. The RF unit 614 transmits the selected data signal to the AT 100.

The scheduler and controller 613 performs establishment/release of a TCH and session negotiation with the AT 100 via the RF unit 614.

The PCFs 108a and 108b each include an SC/MM 620 for negotiating session information to be used during communication with the AT 100 according to an exemplary embodiments, and a controller and selector 618 for selecting the AN 103b accessed by the corresponding AT 100, transmitting data received from a PDSN to the selected AN 103b, and transmitting data received from the AT 100 to the PDSN. The controller and selector 618 controls a general network operation and a flow of packets, and takes charge of a signaling process.

The PCFs 108a and 108b each include therein the SC/MM 620, and the SC/MM 620 manages mobility information and session information of the AT 100 according to an exemplary embodiment of the present invention.

Although a structure of only the target PCF 108b is illustrated in FIG. 6, the source PCF 108a also has the same structure as that of the target PCF 108b.

According to exemplary embodiments of the present invention, the SC/MM 620 of the PCF assigns a UATI to an AT 100 that requested the UATI, sends a request for authentication information for the AT 100 to the target AN 103b, and transmits basic traffic session information. In addition, the SC/MM 620 generates a message used for sending a request for prior session information for the AT 100 to the source PCF 108a based on a Hardware ID (HW_ID) and an Old_UATI of the AT 100, included in an Al14-General Update message received from the target AN 103b, retrieves session information for the AT 100 from the source PCF 108a and stores the retrieved session information.

Further, the SC/MM 620 compares the Hardware ID of the AT 100 received from the source PCF 108a with a Hardware ID received from the target AN 103b to determine whether they are session information for the same AT 100.

According to an exemplary embodiment of the present invention, in order to delete session information for the AT 100 stored in the source PCF 108a, the SC/MM 620 determines whether a Session Removal Indicator of an A14 Indicator in the A14-General Update message received from the target AN 103b is set to '1', and if the Session Removal Indicator is set to '1', generates an AI 3-Session Release Request message for deleting prior session information for the AT 100 stored in the source PCF 108a. However, if the Session Removal Indicator is not set to '1', the SC/MM 620 retrieves the session information for the AT 100 from the source PCF 108a and stores the retrieved session information.

Figure 7:
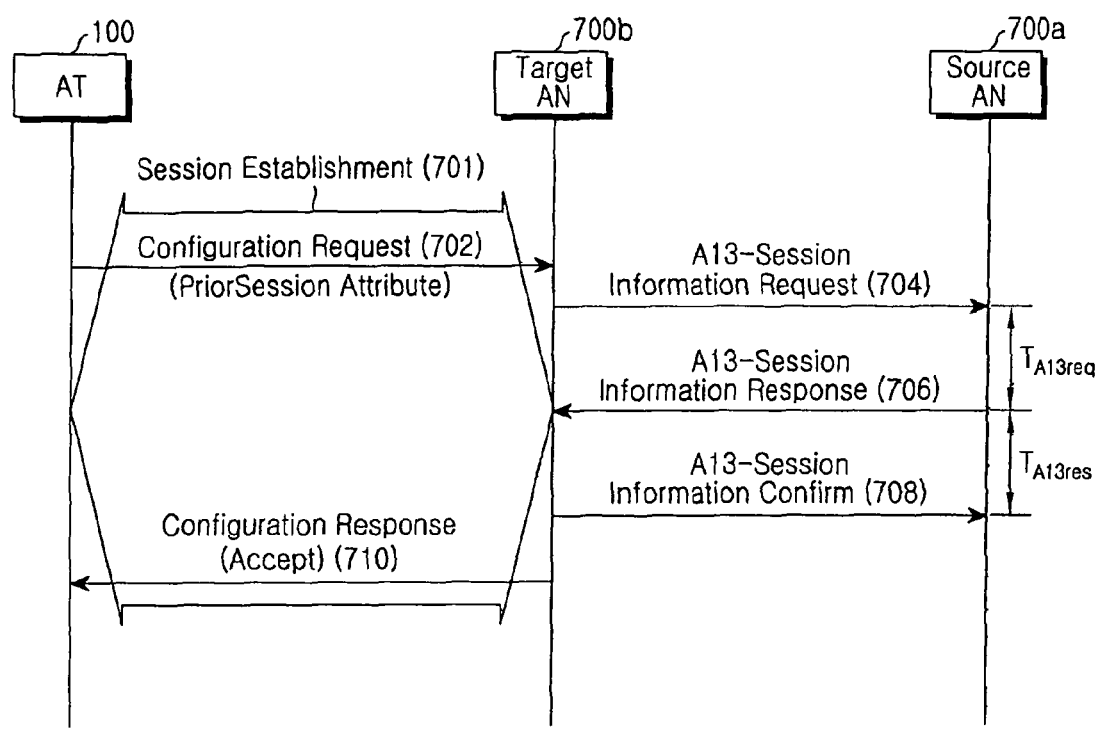
FIG. 7 is a call flow diagram between network elements for acquiring session information for an AT from a source PCF by a target PCF according to a third exemplary embodiment of the present invention.
Figure 8:
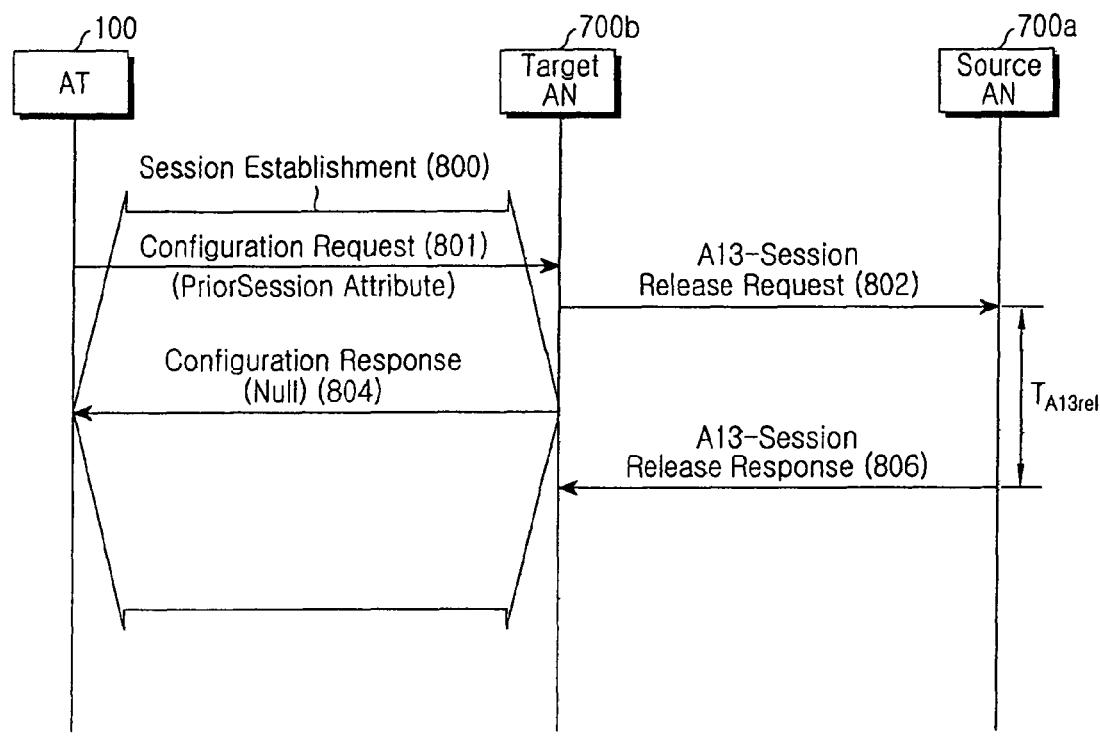
FIG. 8 is a call flow diagram between network elements for deleting session information of an AT stored in a source AN by a target AN according to a fourth exemplary embodiment of the present invention.

Although FIGS. 1 to 6 have been described so far with reference to the exemplary structure in which the SC/MM 620 is included in the PCFs 108a and 108b, FIGS. 7 and 8 will now be described with reference to an exemplary structure in which the SC/MM 620 is included in the ANs 103a and 103b. In FIGS. 7 and 8, a target AN will be denoted by reference numeral 700b and a source AN will be denoted by reference numeral 700a to distinguish these ANs from the ANs described in the first and second exemplary embodiments of the present invention.

FIG. 7 is a call flow diagram between network elements for acquiring session information for an AT from a source PCF by a target PCF according to a third exemplary embodiment of the present invention.

Referring to FIG. 7, in step 702, an AT 100 transmits to a target AN 700b a Configuration Request message including therein a PriorSession Attribute such as a Hardware ID and an Old_UATI for the corresponding AT 100, for session establishment 701.

In step 704, the target AN 700b receiving the Configuration Request message for the session establishment procedure, detects a need for retrieval of an HRPD session for the AT 100 based on the prior session information, and transmits to a source AN 700a an A13-Session Information Request message with SSIR to request HRPD prior session information for the Old_UATI (or Hardware ID) of the AT 100. At this time, the target AN 700b starts a timer TA13req.

In step 706, the source AN 700a checks validity of the A13-Session Information Request message, and transmits the requested HRPD prior session information of the AT 100 to the target AN 700b using an A13-Session Information Response message. At this moment, the source AN 700a activates a timer TA13res.

In step 708, the target AN 700b stops the timer TA13req. The target AN 700b compares a Hardware ID included in the SSIR transmitted by the AT 100 with a Hardware ID in the SSIR transmitted by the source AN 700a.

If the two Hardware IDs are identical to each other, the target AN 700b transmits in step 708 an A13-Session Information Confirm message to the source AN 700a to indicate the correct receipt of the HRPD prior session information for the AT 100. Upon receiving the A13-Session Information Confirm message, the source AN 700a deletes the HRPD prior session information for the corresponding AT 100. At this time, the source AN 700a stops the timer TA13res.

In step 710, the target AN 700b includes an 'Accept' indication in a Configuration Response message and transmits the Configuration Response message to the AT 100, and the AT 100 and the target AN 700b complete the Session Establishment procedure 701.

FIG. 8 is a call flow diagram between network elements for deleting session information of an AT stored in a source AN by a target AN according to a fourth exemplary embodiment of the present invention.

Referring to FIG. 8, in step 801, an AT 100 transmits a Configuration Request message with PriorSession Attribute to a target AN 700b, performing a Session Establishment procedure 800.

Upon receiving the Configuration Request message with PriorSession Attribute in the course of the Session Establishment 800, the target AN 700b transmits in step 802 an A13-Session Release Request message to a source AN 700a according to an operator's decision indicating that it will not use the session information of the source AN 700a. At this time, the target AN 700b stars a timer TA13rel.

In step 804, the target AN 700b transmits a Configuration Response message in which the PriorSession Attribute is set to 'NULL'.

In step 806, the source AN 700a deletes an SSIR related to the PriorSession Attribute of the AT 100, and transmits an A13-Session Release Response message in response to the A13-Session Release Request message. At this time, the target AN 700b stops the timer TA13rel.

As can be understood from the foregoing description, in the CDMA 2000 1x EV-DO (HRPD) mobile communication system for high-speed data transmission according to the present invention, when an AT moves between subnets with the radio link lost or its power off, it can use the intact session information used in the source subnet even in a target subnet, contributing to the prevention of the unnecessary session negotiation process. Further, it is also possible to delete session information for the AT stored in the source subnet, thereby preventing the session information from being unnecessarily stored in a PCF.

While the invention has been shown and described with reference to a certain exemplary embodiment thereof, it will be understood by those skilled in the art that various changes in form and details may be made therein without departing from the spirit and scope of the invention as defined by the appended claims.

What is claimed is:

1. A method for managing session information of an access terminal (AT) that has moved from a source subnet to a target subnet, the method comprising the steps of:

performing, by the AT, a universal access terminal identifier (UATI) assignment to acquire a new UATI, when the AT moves to the target subnet with a radio link lost;

requesting, by the AT, a connection setup to target packet control function (PCF) through a target access network (AN) of the target subnet;

transmitting, by the target PCF, a message with information indicating authentication required and default session information;

(a) acquiring, by the target AN, a hardware identifier (ID) of the AT from the AT;

(b) transmitting, by the AT, a message with a prior universal access terminal identifier (UATI) to the target AN to perform session negotiation with the target AN of the target subnet;

(c) transmitting, by the target AN, a message with the hardware ID and the prior UATI to a target packet control function (PCF) to request retrieval of session information of the AT;

(d) sending, by the target PCF, a request for transmission of prior session information for the AT to a source PCF of the source subnet, found using the prior UATI; and (e) receiving, by the target PCF, a response having the prior session information from the source PCF and retrieving the session information of the AT using the received prior session information, wherein the step (e) comprises the steps of:

receiving, by the target PCF, the response having the prior session information for the AT with a previously stored hardware ID of the AT from the source PCF;

determining by the target PCF whether the two hardware IDs received in the steps (c) an (e) are identical to each other; and if the two hardware IDs are identical to each other, transmitting, by the target PCF, to the target AN a message indicating the normal retrieval of the session information of the AT; and wherein the hardware ID received from the target AN is used to identify the prior session information.

2. The method of claim 1, wherein the prior UATI transmitted by the AT comprises at least one prior session attribute.

3. The method of claim 1, wherein the step (d) comprises the step of transmitting, by the target PCF, a session information request message with the prior UATI to the source PCF.

4. The method of claim 1, wherein the step (c) further comprises the step of transmitting, by the target AN, the hardware ID of the AT to the target PCF.

5. The method of claim 3, wherein the step (e) further comprises the step of inquiring, by the source PCF, about prior session information mapped to the prior UATI.

6. The method of claim 4, wherein the step (e) further comprises the step of inquiring, by the source PCF, about prior session information mapped to the hardware ID.

7. A system for managing session information of an access terminal (AT) that has moved from a source subnet to a target subnet, the system comprising:

a target access network (AN) of the target subnet;

a target packet control function (PCF) of the target subnet; and a source PCF of the source subnet, wherein the AT is configured for performing a universal access terminal identifier (UATI) assignment to acquire a new UATI, when the AT moves to the target subnet with a radio link lost, and requesting a connection setup to the target PCF through the target AN, the target PCF is configured for transmitting a message with information indicating authentication required and default session information;

the target AN is configured for acquiring a hardware identifier (ID) of the AT from the AT, establishing a traffic channel to the AT, and sending a request with the hardware ID and a prior universal access terminal identifier (UATI) for retrieving prior session information of the AT to the target PCF upon receiving from the AT a message with the UATI of the AT for session negotiation;

the source PCF is configured for storing prior session information of the AT, wherein the target PCF, upon receiving the request for retrieving prior session information of the AT from the target AN, sends a request for transmission of prior session information to the source PCF found using the prior UATI, and retrieves prior session information of the AT by receiving a response having the prior session information from the source PCF, wherein the hardware ID is used to identify for the prior session information, wherein the target AN acquires the hardware ID of the AT and delivers the acquired hardware ID to the target PCF, wherein to request transmission of the prior session information, the target PCF transmits the hardware ID to the source PCF, wherein the source PCF transmits a previously stored hardware ID of the AT to the target PCF along with the response with the prior session information, and wherein the target PCF compares the hardware ID received from the source PCF with the hardware ID acquired from the AT, and retrieves the prior session information of the AT if the two hardware IDs are identical to each other.

8. The system of claim 7, wherein the prior UATI transmitted by the AT comprises at least one prior session attribute.

9. The system of claim 7, wherein the source PCF receives the prior UATI from the target PCF and transmits the prior session information of the AT mapped to the prior UATI to the target PCF.

10. The system of claim 7, wherein the source PCF transmits to the target PCF the prior session information of the AT mapped to the hardware ID received from the target PCF.

11. A method for managing session information of an access terminal (AT) that has moved from a source subnet to a target subnet, the method comprising the steps of:

performing, by the AT, a universal access terminal identifier (UATI) assignment to acquire a new UATI, when a target access network (AN) has failed to retrieve prior session information;

requesting, by the AT, a connection setup to target packet control function (PCF) through a target access network (AN);

transmitting, by the target PCF, a message with information indicating authentication required and default session information;

(a) acquiring, by the target access network (AN), a hardware identifier (ID) of the AT from the AT;

(b) transmitting, by the AT, a message including therein a prior universal access terminal identifier (UATI) as a prior session attribute to the AN to perform session negotiation with the target AN of the target subnet;

(c) transmitting, by the target AN, a message with the hardware ID and the prior UATI to a target packet control function (PCF) to request deletion of the prior session information of the AT;

(d) sending, by the target PCF, a request for deletion of the prior session information for the AT to a source PCF found using the prior UATI; and (e) transmitting, by the target PCF, to the target AN a message indicating the deletion of the prior session information of the AT upon detecting the deletion of the session information of the AT from the source PCF, wherein the hardware ID is used to identify the prior session information to be deleted, and wherein the hardware ID and the prior UATI are transmitted in the form of a session state information record.

12. The method of claim 11, wherein the step (c) comprises the step of determining by the target PCF whether predetermined information indicating whether to delete the prior session information for the AT, stored in the source PCF, is set in the message received from the target AN.

13. The method of claim 11, wherein the step (d) further comprises the step of deleting, by the source PCF, the prior session information mapped to the prior UATI.

14. The method of claim 11, wherein the step (d) further comprises the step of deleting, by the source PCF, the prior session information mapped to the hardware ID.

15. A system for managing session information of an access terminal (AT) that has moved from a source subnet to a target subnet, the system comprising:

a target access network (AN) of the target subnet;

a target packet control function (PCF) of the target subnet; and a source PCF of the source subnet, wherein the AT is configured for performing a universal access terminal identifier (UATI) assignment to acquire a new UATI, when a target access network (AN) has failed to retrieve prior session information, and requesting a connection setup to the target PCF through the target AN, the target PCF is configured for transmitting a message with information indicating authentication required and default session information, the target is configured for acquiring a hardware identifier (ID) of the AT from the AT, establishing a traffic channel to the AT, performing session negotiation with the AT, and sending a request with the hardware ID and a prior UATI for deleting prior session information for the AT to the target PCF of the target subnet upon receiving from the AT a message including therein the UATI of the AT as a prior session attribute for the session negotiation;

the source PCF is configured for storing the prior session information of the AT;

wherein the target PCF, upon receiving the request for deleting the prior session information of the AT from the target AN, sends a request for deleting the prior session information to the source PCF found using the prior UATI, and transmits a message indicating the deletion of the prior session information to the target AN upon detecting the deletion of the prior session information from the source PCF, wherein the hardware ID is used to identify the prior session information to be deleted, and wherein the hardware ID and the prior UATI are transmitted in the form of a session state information record.

16. The system of claim 15, wherein the target PCF checks a message received from the target AN to determine whether predetermined information indicating whether to delete the prior session information for the AT, stored in the source PCF, is set in the message received from the target AN, and transmits a request for deleting the prior session information of the AT to the source PCF if the predetermined information is set in the received message.

17. The system of claim 15, wherein the source PCF receives the prior UATI from the target PCF and deletes the prior session information of the AT mapped to the prior UATI.

18. The system of claim 15, wherein the target AN acquires a hardware identifier (ID) of the AT and delivers the acquired hardware ID to the target PCF, wherein to request deletion of the prior session information, the target PCF transmits the hardware ID to the source PCF.

19. The system of claim 18, wherein the source PCF deletes the prior session information of the AT mapped to the hardware ID received from the target PCF.

20. A method for managing session information of an access terminal (AT) that has moved from a source subnet to a target subnet, the method comprising the steps of:

receiving, by a target access network (AN) of the target subnet, a configuration request message with a prior session attribute from the AT when the AT moves to the target subnet with a radio link lost;

sending, by the target AN, a request for prior session information of the AT to a source AN of the source subnet;

determining by the source AN whether the request of the target AN is valid, and transmitting a response having the prior session information of the AT with a hardware ID being previously stored in the source AN to the target AN if the request of the target AN is valid; and comparing, by the target AN, a hardware identifier (ID) received from the AT with the hardware ID received from the source AN to determine whether the prior session information received from the source AN is prior session information for the AT, wherein the prior session attribute comprises the hardware ID and a prior universal access terminal identifier (UATI), wherein the hardware ID received from the AT is used to identify the prior session information, and wherein the target AN determines whether the hardware ID received from the AT is identical to the hardware ID received from the source AN, and retrieves the prior session information of the AT if the two hardware IDs are identical to each other.

21. A system for managing session information of an access terminal (AT) that has moved from a source subnet to a target subnet, the system comprising:

a target access network (AN) of the target subnet for receiving a configuration request message with a prior session attribute from the AT when the AT moves to the target subnet with a radio link lost, sending a request for prior session information for the AT to a source AN of the source subnet, comparing a hardware identifier (ID) received from the AT with a hardware ID received from the source AN to determine whether the prior session information received from the source AN is prior session information for the AT and determining whether prior session information received from the source AN is prior session information for the AT; wherein, the source AN determines whether the request for prior session information for the AT, received from the target AN, is valid, and transmits a response having the prior session information of the AT with the hardware ID being previously stored in the source AN to the target AN if the request is valid, wherein the prior session attribute comprises the Hardware ID and a prior universal access terminal identifier (UATI), wherein the hardware ID received from the AT is used to identify for the prior session information, and wherein the target AN determines whether the hardware ID received from the AT is identical to the hardware ID received from the source AN, and retrieves the prior session information of the AT if the two hardware IDs are identical to each other.

22. A method for managing session information of an access terminal (AT) that has moved from a source subnet to a target subnet, the method comprising the steps of:

receiving, by a target access network (AN) of the target subnet, a configuration request message with a hardware Identifier (ID) of the AT from the AT when the target AN has failed to retrieve prior session information;

sending, by the target AN, a request for deleting prior session information of the AT to a source AN of the source subnet; and deleting, by the source AN, the prior session information related to the hardware ID for the AT upon receiving the request for deleting the prior session information for the AT from the target AN, wherein the hardware ID is used to identify the prior session information to be deleted.

23. The method of claim 22, further comprising the step of transmitting, by the target AN, a configuration response message with 'NULL' to the AT.

24. A system for managing session information of an access terminal (AT) that has moved from a source subnet to a target subnet, the system comprising:

a target access network (AN) of the target subnet for receiving a configuration request message hardware Identifier (ID) of the AT from the AT when the target AN has failed to retrieve prior session information, sending a request for deleting prior session information for the AT to a source AN of the source subnet; wherein the source AN deletes the prior session information related to the hardware ID of the AT upon receiving the request for deleting the prior session information of the AT from the target AN, wherein the hardware ID is used to identify the prior session information to be deleted.

25. The system of claim 24, wherein the target AN transmits a configuration response message with 'NULL' to the AT.

26. A method for managing session information of an access terminal (AT) that has moved from a source subnet to a target subnet, the method comprising the steps of:

performing, by the AT, a universal access terminal identifier (UATI) assignment to acquire a new UATI, when the AT moves to the target subnet with a radio link lost;

requesting, by the AT, a connection setup to target packet control function (PCF) through a target access network (AN) of the target subnet;

transmitting, by the target PCF, a message with information indicating authentication required and default session information;

(a) acquiring, by the target AN, a hardware identifier (ID) of the AT and performing session negotiation with the AT;

(b) transmitting, by the target AN, a first message including the hardware ID and a prior UATI as a session state information record (SSIR) of the AT to the target PCF to request retrieval of prior session information of the AT;

(c) upon receiving the first message, finding, by the target PCF, about a source PCF of the source subnet based on the prior UATI, and transmitting a second message with the SSIR to the source PCF to request transmission of prior session information for the AT;

(d) upon receiving the second message, inquiring, by the source PCF, a third message with the prior session information for the AT and a hardware ID of the AT being previously stored in the source PCF and delivering a third message including a hardware ID of the AT and the prior session information to the target PCF;

(e) determining by the target PCF whether the hardware ID acquired from the AT is identical to the hardware ID received from the source PCF, and if the two hardware IDs are identical to each other, transmitting to the target AN a fourth message indicating normal receipt of the prior session information; and (f) upon receiving the fourth message, completing the session negotiation with the AT by the target AN, wherein the hardware ID acquired from the AT is used to identify the prior session information.

27. The method of claim 26, wherein the step (e) further comprises the step of transmitting, by the target PCF, to the source PCF a fifth message indicating normal receipt of the prior session information upon receiving the normal receipt of the prior session information.

28. The method of claim 27, further comprising the step of deleting, by the source PCF, prior session information for a corresponding AT upon receiving the fifth message.

29. The method of claim 26, wherein the step (d) comprises the step of inquiring, by the source PCF, about prior session information mapped to the hardware ID of the AT.

30. The method of claim 26, wherein the step (d) comprises the step of inquiring, by the source PCF, about prior session information mapped to the prior UATI of the AT.

31. The method of claim 26, wherein the first message includes an A14-General Update message and the fourth message includes an A14-General Update Complete message.

32. The method of claim 26, wherein the second message includes an A13-Session Information Request message and the third message includes an A13-Session Information Response message.

33. The method of claim 26, wherein the step (a) comprises the step of receiving, by the target AN, the prior UATI of the AT.

34. A target packet control function (PCF) apparatus for retrieving session information for an access terminal (AT), comprising:

a controller and selector for controlling a packet flow and a signaling process with a target access network (AN); and a session control/mobility management (SC/MM) for receiving a hardware identifier (ID) and a prior universal access terminal identifier (UATI) of the AT from the target AN when the AT moves to the target subnet with a radio link lost and requests a connection setup to a target PCF through the target AN, finding a source PCF using the prior UATI and retrieving session information of the AT by receiving a response having prior session information for the AT with a hardware ID being previously stored in the source PCF from the source PCF, wherein the hardware ID acquired by the target AN is used to identify the prior session information, and wherein the SC/MM determines whether the hardware ID received from the target AN is identical to the hardware ID received from the source PCF, and retrieves the prior session information of the AT if the two hardware IDs are identical to each other.

35. The target PCF of claim 34, wherein the SC/MM transmits the prior UATI to the source PCF to retrieve the prior session information for the AT from the source PCF.

36. A method for retrieving, by a target packet control function (PCF), session information of an access terminal (AT) that has moved from a source subnet to a target subnet, the method comprising the steps of:
- (a) sending a request for authentication information of the AT to a target access network (AN) when the AT moves to the target subnet with a radio link lost and requests a connection setup to the target PCF through the target AN;
- (b) receiving a hardware identifier (ID) and a prior universal access terminal identifier (UATI) of the AT from the target AN, and finding a source PCF using the prior UATI;
- (c) sending a request for prior session information for the AT to the source PCF;
- (d) receiving a response having the prior session information for the AT with a hardware ID being previously stored in the source PCF from the source PCF;
- (e) if the prior session information received from the source PCF is valid, transmitting to the target AN a message indicating an update of the session information,
- wherein the hardware ID received from the target AN is used to identify the prior session information, and
- wherein the target PCF determines whether the hardware ID received from the target AN is identical to the hardware ID received from the source PCF, and retrieves the prior session information of the AT if the two hardware IDs are identical to each other.

37. The method of claim 36, wherein the step (c) comprises the step of transmitting, by the target PCF, an A 13-Session Information Request message with the prior UATI to the source PCF.

38. The method of claim 36, further comprising the step of assigning a new UATI to the AT by the target PCF upon receiving a request for assignment of a UATI from the AT.

39. The method of claim 36, wherein the step (d) comprises the step of determining whether a hardware ID received from the target AN is identical to a hardware ID received from the source PCF.

40. A method for managing session information of an access terminal (AT) that has moved from a source subnet to a target subnet, the method comprising the steps of:
- performing, by the AT, a universal access terminal identifier (UATI) assignment to acquire a new UATI, when a target access network (AN) has failed to retrieve prior session information;
- requesting, by the AT, a connection setup to target packet control function (PCF) through a target access network (AN);
- transmitting, by the target PCF, a message with information indicating authentication required and default session information;
- (a) acquiring, by the target AN, a hardware identifier (ID) from the AT, and performing session negotiation with the AT;
- (b) transmitting, by the target AN, to the target PCF of the target subnet a first message including therein the hardware ID and s prior UATI (Universal Access terminal Identifier) as a session state information record (SSIR) of the AT to request deletion of prior session information of the AT;
- (c) upon receiving the first message, finding, by the target PCF, a source PCF of the source subnet based on the prior UATI and transmitting a second message with the SSIR to the source PCF to request deletion of the prior session information for the AT;
- (d) upon receiving the second message, inquiring, by the source PCF, the prior session information for the AT, deleting the prior session information, and delivering to the target PCF a third message indicating the deletion of the prior session information;
- (e) upon receiving the third message, transmitting, by the target PCF, to the target AN a fourth message indicating the deletion of the prior session information for the AT; and
- (f) after transmitting the first message, delivering, by the target AN, a fifth message indicating non-use of the prior session information to the AT,
- wherein the hardware ID is used to identify the prior session information to be deleted, and
- wherein the hardware ID and the prior UATI are transmitted in the form of a session state information record.

41. The method of claim 40, wherein the step (b) comprises the step of determining by the target PCF whether predetermined information indicating whether to delete the prior session information of the AT, stored in the source PCF, is set in the first message.

42. The method of claim 41, wherein upon receiving the second message, the source PCF deletes the prior session information mapped to the hardware ID of the AT.

43. The method of claim 41, wherein upon receiving the second message, the source PCF deletes the prior session information mapped to the prior UATI of the AT.

44. The method of claim 40, wherein the first message includes an A14-General Update message and the fourth message includes an A14-General Update Complete message.

45. The method of claim 40, wherein the second message includes an A13-Session Release Request message and the third message includes an A13-Session Release Response message.

46. The method of claim 41, wherein the step of determining by the target PCF whether predetermined information indicating whether to delete the prior session information of the AT, stored in the source PCF, is set in the first message comprises the step of determining whether a session removal indicator in an A14-indicator of the A14-General Update message received from the target AN is set to '1'.

47. The method of claim 41, further comprising the step of retrieving, by the target PCF, the prior session information of the AT from the source PCF, if the predetermined information is set in the first message.

48. The method of claim 40, wherein the fifth message includes a configuration response message with 'NULL'.

49. The method of claim 40, wherein the step (a) comprises the step of receiving, by the target AN, the prior UATI of the AT.

50. A target packet control function (PCF) apparatus for managing session information of an access terminal (AT) that has moved from a source subnet to a target subnet, comprising:
- a controller and selector for controlling a packet flow and a signaling process with a target access network (AN); and
- a session control/mobility management (SC/MM) for receiving a hardware identifier (ID) and a prior universal access terminal identifier (UATI) of the AT from the target AN when a target access network (AN) has failed to retrieve prior session information, finding a source PCF using the prior UATI and determining whether predetermined information for instructing the source PCF to delete prior session information for the AT is set,
- wherein the hardware ID is acquired by the target AN and is used to identify the prior session information to be deleted, and wherein the hardware ID and the prior UATI is transmitted in the form of a session state information record.

51. The target PCF of claim 50, wherein the SC/MM determines whether a session removal indicator in an A14 indicator of an A14-General Update message received from the target AN is set to '1', and determines whether to delete the session information of the AT stored in the source PCF according to the determination result.

52. A method for managing, by a target packet control function (PCF), session information of an access terminal (AT) that has moved from a source subnet to a target subnet, the method comprising the steps of:

(a) sending a request for authentication information of the AT to a target access network (AN) when a target access network (AN) has failed to retrieve prior session information;

(b) receiving a hardware identifier (ID) and a prior universal access terminal identifier (UATI) of the AT from the target AN to find a source PCF;

(c) determining whether predetermined information indicating whether to delete prior session information of the AT, stored in the source PCF, is set in a message received from the target AN; and (d) sending a request for deleting the prior session information of the AT to the source PCF, if the predetermined information is set in the received message, wherein the hardware ID is acquired by the target AN and is used to identify the prior session information to be deleted, and wherein the hardware ID and the prior UATI is transmitted in the form of a session state information record.

53. The method of claim 52, wherein the steps (c) and (d) comprise the steps of:

determining by the target PCF whether a session removal indicator in an A14 indicator of an A14-General Update message received from the target AN is set to '1'; and transmitting an A13-Session Release Request message to delete the prior session information of the AT stored in the source PCF, if the session removal indicator is set to '1'.

54. The method of claim 52, wherein the step of determining by the target PCF whether predetermined information indicating whether to delete the prior session information of the AT, stored in the source PCF, is set in the first message comprises the step of determining whether a session removal indicator in an A14 indicator of the A14-General Update message received from the target AN is set to '1'.

* * * * *